United States Patent
Jin et al.

[11] Patent Number: 5,920,897
[45] Date of Patent: Jul. 6, 1999

[54] APPARATUS AND METHOD FOR PROVIDING MULTIPLE CHANNEL CLOCK-DATA ALIGNMENT

[75] Inventors: Robert X. Jin; Eric T. West, both of San Jose; Stephen F. Dreyer, Los Altos, all of Calif.

[73] Assignee: Seeq Technology, Incorporated, Fremont, Calif.

[21] Appl. No.: 08/693,760

[22] Filed: Aug. 7, 1996

[51] Int. Cl.$^6$ .............................. G06P 13/00; H04J 3/06
[52] U.S. Cl. .................. 711/167; 711/109; 395/558; 370/464; 370/516; 370/536
[58] Field of Search .................. 711/167, 109, 711/104, 149, 201; 395/555, 556, 558, 559, 200.42, 200.43, 200.44, 200.45; 370/464, 468, 516, 536

[56] References Cited

U.S. PATENT DOCUMENTS 4,984,251 1/1991 Perloff ...................................... 370/536
5,251,210 10/1993 Mann et al. .............................. 370/536

OTHER PUBLICATIONS

Fast Ethernet Alliance, "Presentation Reprints", IEEE 802.3u, Mar. 7, 1994.
Supplement to IEEE Standard 802.3, 100BASE–T, 802.3u/ D5.3, Jun. 12, 1995, pp. 59–138.
J. Scott Gardner, "Designing with the IDT SyncFIFO ™: The Architecture of the Future", Application Note AN–60 (Integrated Device Technology, Inc.), pp. 1–12.
"10/100 Base–T4 Fast–Φ™ Transceiver", BCM5000–SP9 (Broadcom Corporation), Apr. 2, 1996, pp. 1–38.
"100Base–T4/10BASE–T Fast Ethernet Transceiver (CAT3)", Doc. No. 38–00415 (Cypress–CY7C971), pp. 7–42 to 7–65.
"10Mbps/100Mbps Lan Physical Layer Interface", (Intel–82553), pp. 1–60.

*Primary Examiner*—Glenn Gossage
*Attorney, Agent, or Firm*—D'Alessandro & Ritchie

[57] ABSTRACT

An apparatus and method for aligning any number of multiple parallel channels of data signals according to a single clock is provided. The synchronization process is accomplished through the use of a First-In-First-Out (FIFO) principle and individual storage elements implementing the FIFO principle for each received data channel. Each channel's data signals are read into a corresponding storage element, maintained in order, and read out upon the assertion of read signals in synchronization with a designated single clock signal. The apparatus and method preferably uses indications of data ready to be read from a storage element implementing the FIFO principle and the presence of a master clock signal to activate the reading of the data from the corresponding storage element. Therefore, each data channel is fully aligned with the master clock signal. The clock-data alignment function may be implemented for a 100BASE-T4 receiver.

49 Claims, 14 Drawing Sheets

APPARATUS AND METHOD FOR PROVIDING MULTIPLE CHANNEL CLOCK-DATA ALIGNMENT

BACKGROUND OF THE INVENTION

1. Field of the Invention

The present invention relates to integrated circuit technology and to integrated circuits used in data communications technology. More particularly, the present invention relates to data communications integrated circuit devices and protocols for enabling the alignment, based on a single clock, of multiple channels of clock-data signals, such as, for example, those used in 100BASE-T4 Ethernet networks.

2. The Prior Art

In a data processing system, it is desirable to maintain synchronization between the data stream and a clock. It is also desirable for the data to have a known relationship to the clock—such as setup time and hold time. If the relationship between the data and the clock becomes unpredictable, the data processing system will generate errors.

In a simple electronic circuit, the data bus and clock line may run side by side through the entire circuit and remain fully synchronized. This is common in integrated circuits and printed circuit boards. However, there are many cases, depending on the transmission media, where it is not possible to run a clock line side by side with the data bus and maintain synchronization. These common media include twisted pair, optical fiber and disk drive heads. In these situations it is common practice in the art to encode the data stream with the clock information. The data and clock information will be encoded into a single stream, sent through the medium, and then separated on the other side of the medium. Separating the clock and data information from a single stream is known as clock-data recovery. An encoding/decoding algorithm is designed to ensure that the clock-data pair will be synchronized.

Often, clock-data recovery involves only one serial data stream and one clock. For example, in the common usage of an Ethernet 10BASE-T system, the clock-data stream is transmitted on one twisted pair and received on another. In this case, only one clock-data channel requires recovery.

Recent developments in data communications, however, have created the need for increasing the amount and speed of transmitted data. As the volume of data communicated increases, there is an increased desire for greater speed of transmission across a variety of media; more and more bits per second need to be transmitted and received. A major limitation preventing this increased speed is the reliability of data signals at high speed. As is known to those of ordinary skill in the art, speed of transmission over current cost-effective media is limited by reliability, therefore limiting the overall speed of data communications.

A promising response to this limitation has been the use of multiple parallel clock-data channels. Multiple parallel channels allow transmission in parallel over multiple carriers rather than in series over a single transmission medium. The transmission speed is then approximately the product of the single channel rate and the number of multiple channels. As will be apparent to those of ordinary skill in the art, this allows a much higher transmission rate over conventional media. For example, with the advent of Fast Ethernet and other new communication protocols, multiple twisted pairs are widely used for achieving higher speeds.

One version of Fast Ethernet uses 100BASE-T4 technology, which transmits and receives clock-data information on three twisted pairs using a specific data coding scheme known as 8B6T coding. By transmitting on three twisted pairs simultaneously, each twisted pair need only transmit one-third (⅓) of the 100 Mbit/sec, or 33 Mbit/sec. By using the 8B6T coding, which converts the 8-bit binary code (a byte) into a 6-bit ternary code, the symbol rate on each twisted pair will be further reduced to six-eighths (⅝) of the binary rate. The symbol rate of 100BASE-T4 is then brought down to 25 MHz, resulting in more reliable transmission over the conventional medium of twisted pair.

Though the use of multiple clock-data channels allows far greater speed of transmission, it creates additional complications in recovering and synchronizing the multiple received clock-data channels. Since there are unknown (and often random) delays on each channel (or on each twisted pair in the case of 100BASE-T4 Ethernet), a dedicated Clock-DATA recovering mechanism is required for each channel. Within each channel the recovered data will have a predictable relationship to the recovered clock. However, across the number of channels, the clock-data pairs will have unknown (and often random) phase delays between them. For proper data processing, the multiple streams of data must be synchronized to a single clock, or aligned. This is commonly called Multiple Receive Clock-DATA Channel Alignment.

Prior art Multiple Receive Clock-DATA Channel Alignment devices typically involve complicated Phase-Lock-Loops (PLLs) with either multiple phase clock outputs or a precision delay line with selectable fine time steps.

In prior art PLL designs with multiple phase clock outputs, such as that shown in FIG. 1, only one PLL will be used to lock onto the various incoming clock-data pairs. This main PLL will have a number of clock taps (or small increments). A complicated digital PLL algorithm will select one of the many different phase clock taps to be the "recovering clock" for each data channel. Then, the recovering clock will be continually modified by the algorithm to account for small changes in phase delay over time.

Other prior art PLL designs, such as the one depicted in FIG. 2, (as presented to the IEEE 802.3 Higher Speed Study Group, Irvine, Calif., September 1993), use one main phase locked loop for one of the data channels. Timing recovery clocks for the rest of the channels are then generated from the main PLL clock. A multi-tapped analog precision delay line positioned after the main PLL clock will generate many different delayed clock signals, one at each tap. Depending on the incoming data stream transition edges and the clock picking algorithms, other channels will select recovering clocks from the analog precision delay chain. This type of design requires both complicated digital PLL circuits and precise analog delay chains.

In either typical PLL design there will necessarily be an algorithm (or algorithms) to: (1) select a recovered clock as a reference; (2) determine the phase differences between the reference clock and the other clocks; and (3) correct each of the non-reference data channels by the amount of their phase difference, thus synchronizing them to the reference clock.

The typical prior art Multiple Receive Clock-DATA Recovery Channel Alignment devices, as embodied by the PLL's described above, have several limitations. First, it is relatively difficult to design a precise clock-data recovery circuit because precision is limited by the number of taps of clocks available, how well the precision delay circuit is designed, or both. This presents an unpleasant tradeoff between alignment precision and circuit cost.

A second limitation concerns the many systems where the signaling is not continuous, such as Ethernet. In Ethernet systems, data travels in sets or groups, generally known as packets or frames; data packets may (and will) arrive unpredictably. In each data packet, a preamble will precede the data string to identify the data. The primary aligning PLL will do the initial lock-in (a zero phase start) during the very short preamble period of every data packet. However, the channels must also be synchronized during the same short preamble period. Since the synchronization process will be implemented on only a few clock edges, large jitters (unexpected changes in signal transmission) during the preamble may cause receiving errors late in the packet.

A third major limitation is the complexity and potential instability of the device. The digital circuit implementing the algorithm that selects the reference clock is highly complex. The algorithm must initially assume the reference clock is not moving. After selecting the recovering clock for the other channels, the reference clock must be adjusted according to the incoming channel data. Usually, this involves adjustment among clock tabs. Selecting clocks very close to the main clock will cause meta-stable data, which, as will be apparent to those of ordinary skill in the art, can cause unpredictable errors throughout the data processing system. Finally, on an overall level, this type of digital circuit is operating on several asynchronous events, making reliable and stable design particularly difficult. Therefore, this circuit, in a reliable form, could be quite expensive.

Accordingly, the growing use of multiple parallel channel transmission calls for further advances in Multiple Receive Clock-DATA Recovery Channel Alignment. There is a pressing need for simpler, faster, more reliable, and more flexible devices to be used in place of the conventional PLL alignment system.

SUMMARY OF THE INVENTION

The present invention is an integrated circuit device and method for implementing Multiple Receive Clock-DATA Recovery Channel Alignment. The present invention allows any number of clock-data channels to be synchronized with a single master clock signal—permitting subsequent use of the data signals in digital processing applications. It will be useful in any circumstance where multiple parallel channels of data transmission are utilized, and where such multiple channels are preferably synchronized.

The present invention implements Multiple Receive Clock-DATA Channel Alignment through the use of a principle that the first data written in is the first read out, and that data can be briefly stored until read out. This is often called a First-In-First-Out (FIFO) principle, and is used in many other applications. In this new application, data signals are written to individual storage elements in conjunction with the clock for the channel. The data signals will then be read from the storage elements in conjunction with a single master clock signal. The resulting synchronization across the parallel channels allows the data signals to be used in subsequent digital processing applications.

The alignment function is based on a FIFO principle. Clock-data signal pairs arrive at the device with random and unknown delays between them. Each signal pair data stream is written into an individual storage element. After allowing data to be written in, the storage element will receive a read assertion signal, allowing the stored data signals to be read out in conjunction with the master clock signal—achieving full synchronization with the master clock signal.

Importantly, the invention allows independence in selection of a particular master clock signal. While in many cases the master clock signal will be selected from among the recovered clock-data channels written into the device, it will be apparent to one of ordinary skill in the art that other clock sources could be used as well.

Additionally, in many possible applications of the invention, the master clock will be the same frequency as the writing clocks. In these cases, the adjustments between the individual channel clock signals and the master clock will be small and a steady flow of data will be formed—allowing a small buffer to be used for alignment purposes.

The invention also obviates the need to continuously adjust for differences between the channel clock signals and the master clock signal. As is known to those of ordinary skill in the art, the differences between individual channel clocks will be in a constant, if small, state of change. As the invention does not need to calculate the magnitude of such differences, it subsequently will not be required to update the calculations to maintain accuracy, therefore greatly decreasing the complexity of applications of the present invention.

The invention is also highly precise. Use of a FIFO principle, unlike conventional approaches to alignment problems, does not limit how closely an individual recovering clock can be centered in the data window. This will result in more reliable recovered data and more precise synchronization.

Finally, the design of the present invention is relatively simple. No complex algorithm-implementation circuit is needed to determine the relationship between different clocks; the degree of difference need not be calculated. Concerns about meta-stable states are alleviated, as a storage element only reads out data after data is settled into the device. And finally, since in many applications, both the input and the output data are the same frequency, the storage elements require only minimal depth.

OBJECTS AND ADVANTAGES OF THE INVENTION

Accordingly, it is an object of the present invention to provide an improved device and method for aligning multiple received data channels.

It is a further object of the present invention to provide a simplified device and method for aligning multiple received data channels.

It is a further object of the present invention to provide a less costly device and method for aligning multiple received data channels.

It is a further object of the present invention to provide a device and method for aligning multiple received data channels which allows independence in the selection of a single master clock signal.

It is a further object of the present invention to provide a device and method for aligning multiple received data channels which does not require the calculation of phase differences between recovered data streams.

It is a further object of the present invention to provide a device and method for aligning multiple received data channels which allows unlimited and continuous adjustment of the relationships between the recovered data channels and the master clock signal.

It is a further object of the present invention to provide a device and method for aligning multiple received data channels which avoids the creation of meta-stable data states.

Yet a further object of the present invention to provide a improved device and method for implementing Multiple Receive Clock-DATA Recovery Channels Alignment in the Fast Ethernet 100BASE-T4 system.

These and many other objects and advantages of the present invention will become apparent to those of ordinary skill in the art from a consideration of the drawings and the ensuing description of the invention.

DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons.

A key element of the present invention is the use of a principle calling for the temporary storage of data signals. The first data stored ("written in") will be the first data read out; the data elements are stored and read sequentially, maintaining their order. Additionally, the writing and reading of data will be controlled—data will only be read out on the receipt of a read assertion signal. This principle is commonly known as a First-In-FirstOut (FIFO) principle.

FIFO principles are used in a wide variety of applications, both electronic and otherwise. The FIFO principle in electronic circuit design is common enough to have been reduced to commercial form—circuits adhering to the FIFO principle are widely available. Such circuits are commonly known as FIFO memories. FIFO memories differ from conventional memories in that traditional addressing is not used. Data is stored and read sequentially, and the standard FIFO memory element is dual-ported—accepting data input to one port, and presenting it to the other. FIFO memories are commonly used as data buffers; they are especially valuable for connecting data busses which operate at different rates.

The present invention uses the FIFO principle as described above in a new application: the alignment of multiple clock-data channels. As will be apparent to those of ordinary skill in the art, commercial FIFO memories may be used in many applications of the invention to implement the FIFO principle outlined above; however, the present invention could also be implemented with a variety of mechanisms adhering to the basic principle of the invention. Therefore, the use of the term "FIFO" and the descriptions of possible implementations of the invention using commercially-available or custom-made FIFO memories are not to be taken as essential limitations of the invention described herein.

Figure 1:
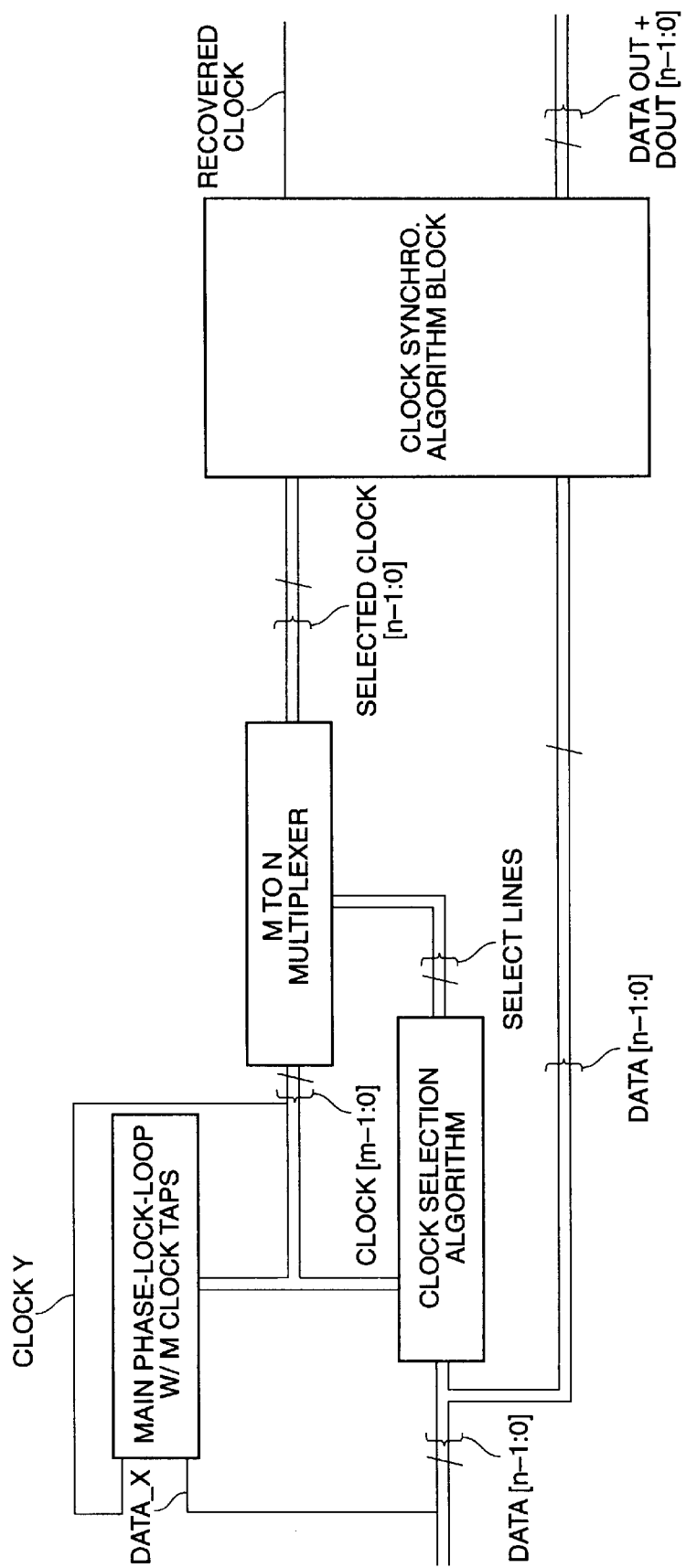
FIG. 1 is a prior art PLL design with multiple phase clock outputs.
Figure 2:
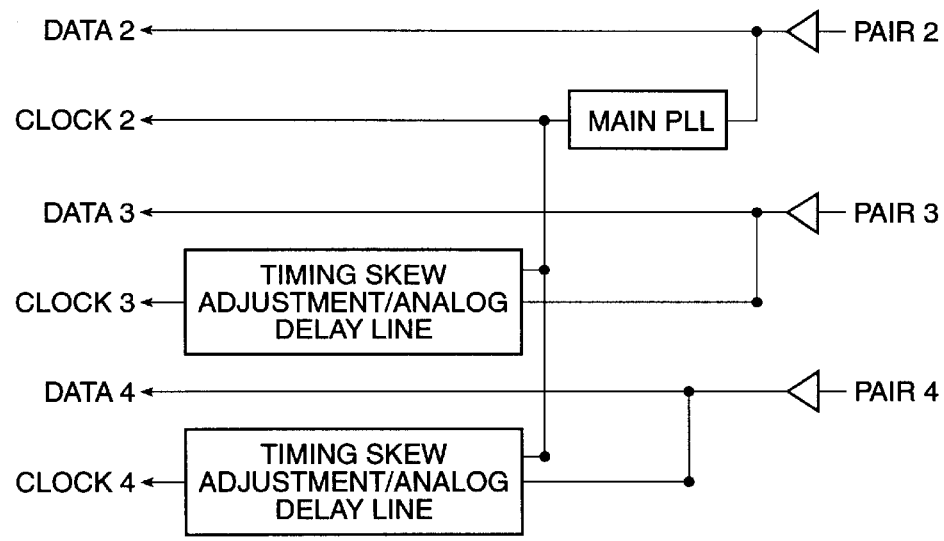
FIG. 2 is a prior art PLL design with analog delay lines.
Figure 3:
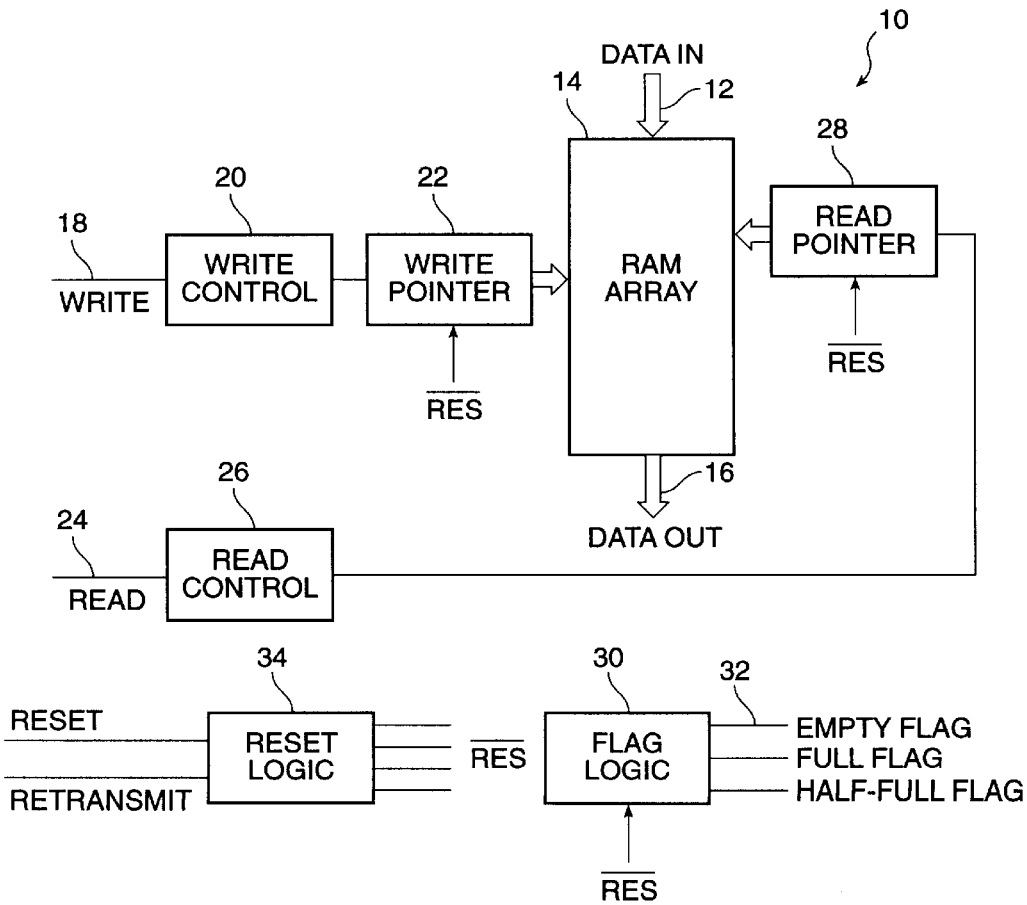
FIG. 3 is a diagram of a typical First-In-First-Out (FIFO) memory circuit.

FIG. 3 depicts a typical FIFO memory circuit; a detailed description may help illustrate the FIFO principle. Turning to FIG. 3, a typical FIFO memory circuit 10 is shown, though many other embodiments of FIFO memory circuits could be used, as would be apparent to one of ordinary skill in the art. At its initial state (no data, no write assertions, no read assertions), the write pointer/counter 22 and the read pointer/counter are set to 0. The flag logic 30 maintains the empty flag 32 at 'on' or 1. Data is "read in" as follows: upon the assertion of write signals 18 at the write control element 20, the data at the input port 12 enters the RAM array 14 accordingly, and is counted and located by the write pointer/counter 22. The flag logic control 30 changes the output of the empty flag 32 to 'off' or 0. Data is removed as follows: the read assertion signal 24 is received by the read control element 26, the read pointer/counter 28 is incremented, and the stored data is read from the RAM array 14 at the data output port 16. When the read pointer/counter 28 value reaches the write pointer/counter 22 value, all data has been read from the RAM array 14. The reset logic element 34 sets the write pointer/counter 22 and the read pointer/counter 28 back to 0. The flag logic control 30 sets the empty flag back to 1.

The present invention uses storage elements adhering to the FIFO principle and associated circuitry to implement an alignment function for any number of clock-data channels.

Figure 4A:
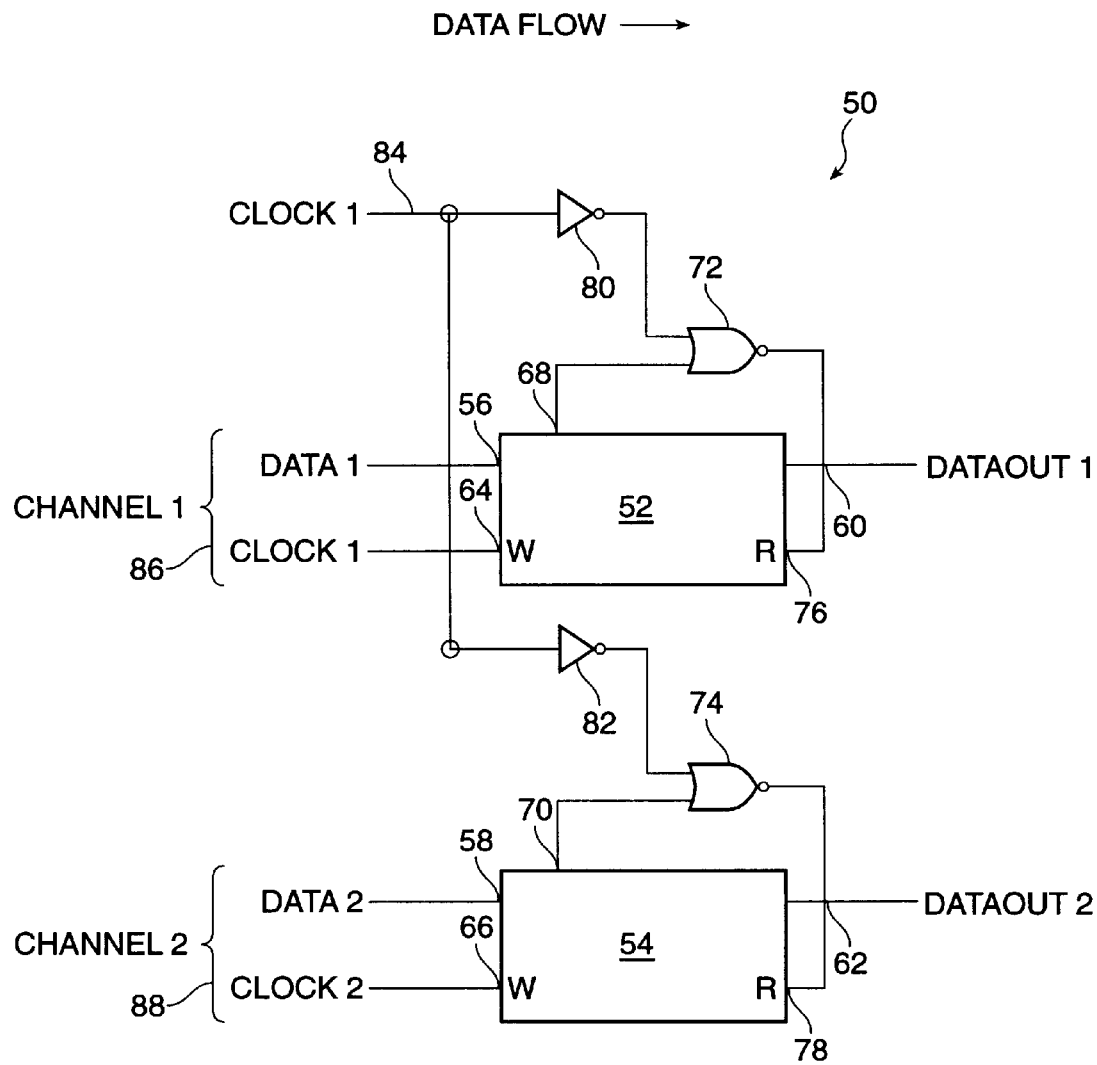
FIG. 4A is a diagram of a preferred embodiment of the present invention as a Multiple Receive Clock-Data Channel Alignment device, in a two-channel configuration.
Figure 4B:
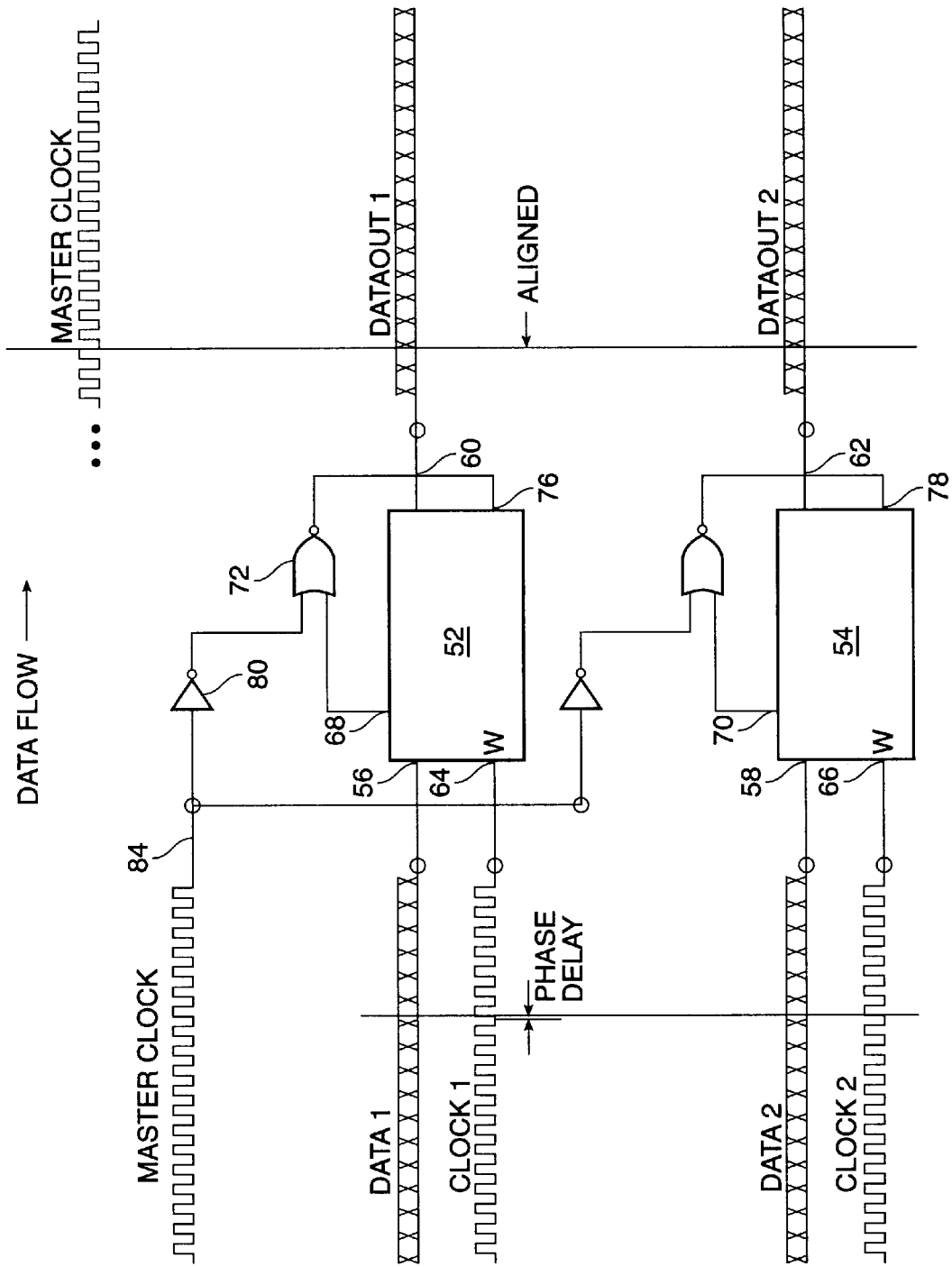
FIG. 4B is a diagram of a preferred embodiment of the present invention as a Multiple Receive Clock-Data Channel Alignment device, in a two-channel configuration, depicting the alignment function.

FIGS. 4A and 4B show an example of a preferred embodiment of the present invention, configured to implement the multiple clock-data channel alignment of two clock-data channels. Turning to FIG. 4A, the multiple clock-data channel alignment device, two channel configuration 50 consists of two storage elements adhering to the FIFO principle 52, 54, each with a data input port 56, 58, and a data output port 60, 62. The clock signal of each clock-data pair serves as the write assertion signal, and is received at the write assertion port 64, 66 of each storage element adhering to the FIFO principle 52, 54. The empty flag output port 68, 70 is attached to a 2-input NOR gate 72, 74. The read assertion port 76, 78 is connected to the output of the NOR gate 72, 74. The second input for the NOR gate 72, 74 is connected to the output of an inverter 80, 82; the inverter 80, 82 inputs are connected to the master clock circuit.

Typical operation of the multiple clock-data channel alignment device, two channel configuration 50 will begin with the storage elements adhering to the FIFO principle 52, 54 in the 'empty' state. The NOR gates 72, 74, are off (Y=0), as the empty flag output port 68, 70 is signaling 'on' (1). As a clock-data signal pair arrives, the assertion of signals through the respective write assertion port 64, 66 causes the data to be read into the storage elements adhering to the FIFO principle 52, 54 through the data input port 56, 58. When data is read into a storage element adhering to the FIFO principle 52, 54, the empty flag output port 68, 70 sends an 'off' (0) signal to the respective NOR gate 72, 74. When the master clock circuit 84 signals 'on' (1) to the inverter 80, 82, the input to the NOR gate 72, 74 is 'off' (0). Thus, when the master clock circuit 84 is on (indicating the correct timing for proper synchronization) and the empty flag output 68, 70 is off (indicating the availability of data) the read assertion port 76, 78 will receive a read assertion signal, allowing data to be read from each storage element adhering to the FIFO principle 52, 54 through the data output port 60, 62.

Figure 4C:
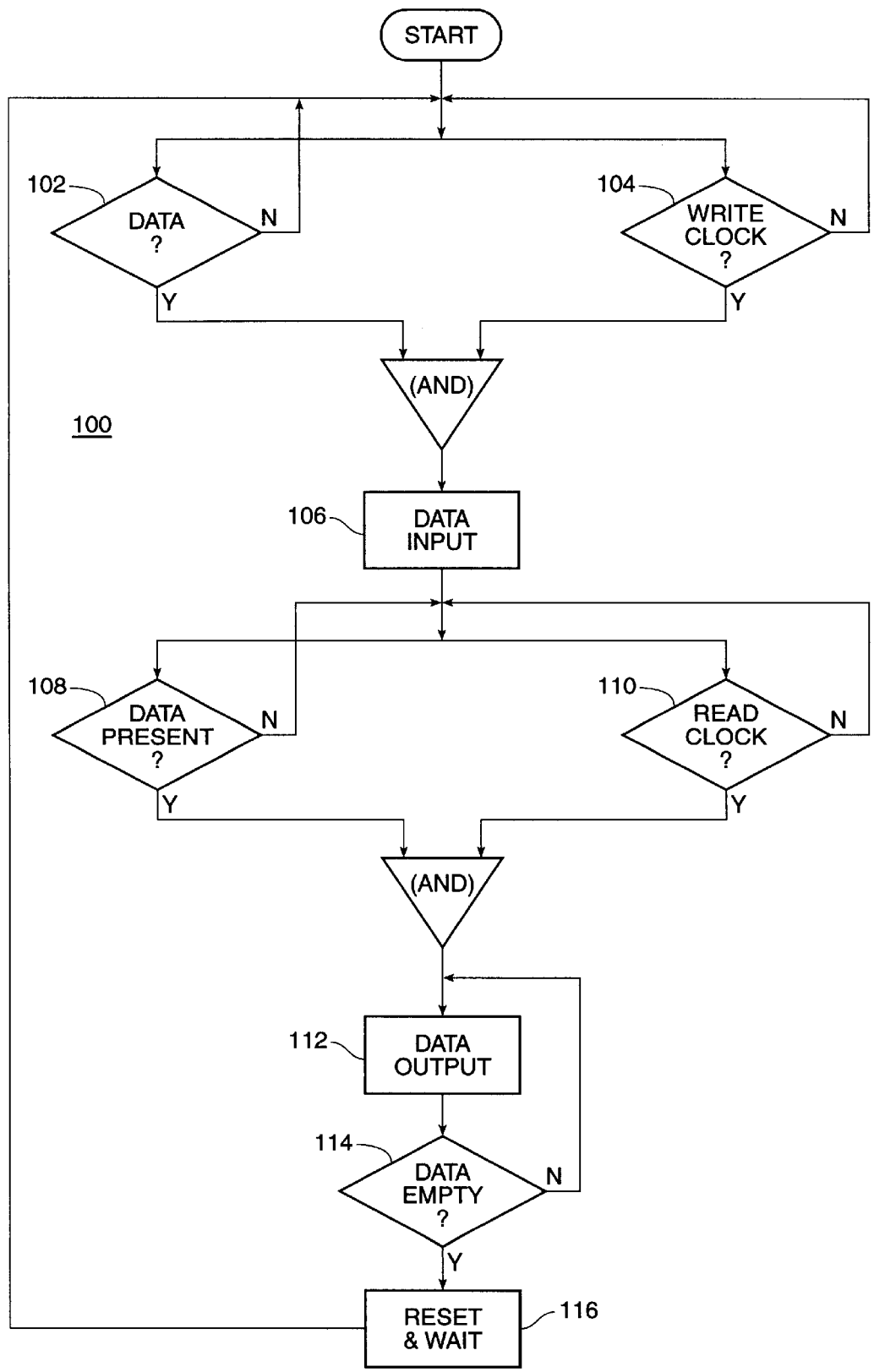
FIG. 4C is a flow chart describing a preferred embodiment of a method for implementing the Multiple Receive Clock-Data Channel Alignment as depicted in FIGS. 4A and 4B, showing an individual channel method.

Turning to FIG. 4C, a preferred embodiment of a method for implementing Multiple Receive Clock-Data Channel Alignment 100 is depicted. The method described in FIG. 4C is for an individual channel; it is, however, applicable to all channels. Upon the assertion of incoming clock signals at the write assertion port 64, 66, and the presence of data at the data input port 56, 58, the two initial decisions 102, 104 will be "yes"—allowing data input to take place 106. After data is stored, a "yes" value on the next two decisions—whether data is present 108 (indicated by the empty flag output port 68, 70 in FIG. 4A), and the presence of a reading clock (the master clock circuit 84 in FIG. 4A) will allow data to be read out 112. After all the data is read out of the storage element adhering to the FIFO principle 52, 54, the data empty decision 114 will be "yes"—the device will then be reset 116—the empty flag output port 68, 70 will again issue "on" or 1—and await the next cycle.

It will be apparent to those of ordinary skill in the art that the present invention operates independently of the respective phase difference between the multiple clock-data signal pairs. As an example for further illustration only, a possible situation may entail the channel 1 signal pair 86 having a phase slightly ahead of the channel 2 signal pair 88. In this circumstance, the arrival of clock-data signals at the channel 1 write assertion port 64 and the channel 1 data input port 56 causes data to be read into the channel 1 storage element adhering to the FIFO principle 52. The channel 1 empty flag output port 68 indicates 'off' to the channel 1 NOR gate 72; the data is then read out of the channel 1 storage element adhering to the FIFO principle 52 at the signal from the master clock circuit 84, in synchronization with the master clock. The channel 2 signal pair 88 will assert write signals, input data, and be read out in a similar fashion, again in synchronization with the signal from the master clock circuit 84.

As will be apparent to those of ordinary skill in the art, the synchronization function does not require the selection of a particular clock. The master clock need not be related to any of the incoming channel clocks. The invention allows great flexibility, therefore, in design and potential applications.

Those of ordinary skill in the art will also recognize that the above-mentioned structure for two-channel alignment could be easily modified to perform multiple receive clock-data alignment for any number of channels with the addition of a storage element adhering to the FIFO principle, NOR gate, inverter, and connective circuitry for each additional channel.

As the present invention does not calculate the differences between each of the channel clocks and the master clock, it does not require additional algorithms or circuitry to perform continuous updating to respond to changes in those differences.

The present invention also does not limit the precision of the synchronization. As the synchronization function is controlled according to the FIFO principle, the reading of the data signals will therefore be able to implement an exceptionally high level of precision without the need for additional circuitry.

Application: Alignment in Fast Ethernet 100BASE-T4

Figure 5:
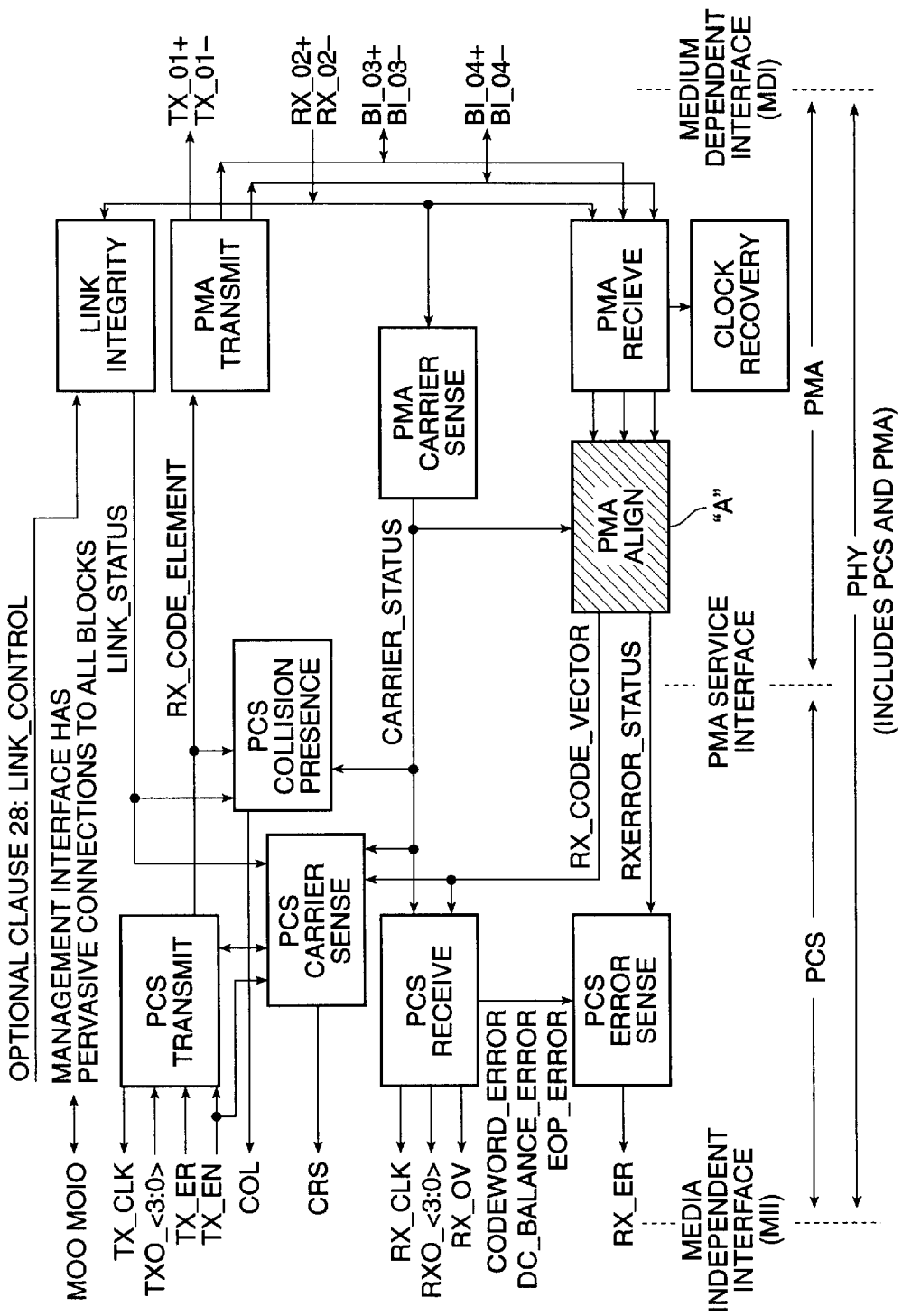
FIG. 5 is a block diagram of the Clause 23, Supplement to IEEE Standard 802.3u guidelines for the 100BASE-T4 Physical Coding Sublayer, Physical Medium Attachment Sublayer, and Baseband Medium, showing the location of the application of the present invention.

One possible application of the present invention is as a Multiple Receive Channel Clock-DATA Channel Alignment device for an Ethernet system designed according to the 100BASE-T4 protocol. The 100BASE-T4 protocol is defined by a Supplement to IEEE Standard 802.3u, Jun. 12, 1995, hereby incorporated by reference as if set forth fully herein. The location of the application of the present invention is defined by Clause 23, "Physical Coding Sublayer (PCS), Physical Medium Attachment Sublayer (PMA) and baseband medium, type 100BASE-T4", Supplement to IEEE Std. 802.3u, Jun. 12, 1995. FIG. 5 is a block diagram of the Clause 23 protocol; the location of the application of the present invention is indicated by reference letter "A".

The 100BASE-T4 protocol calls for the transmission of data over three pairs of conventional twisted pair wiring. This creates three clock-data channels, which in turn creates the need for alignment. The alignment function of the 100BASE-T4 protocol is specified by clause 23.4.1.6, "PMA Align Function." The function of a synchronization device according to "PMA Align" is to accept ternary symbols from the receive function and synchronize the received ternary signals to a master clock to eliminate the effects of unequal pair propagation time (or pair phase delay). An additional function of "PMA Align", not implemented by the present invention, is the proper ordering, or skewing, of the synchronized data.

Figure 6:
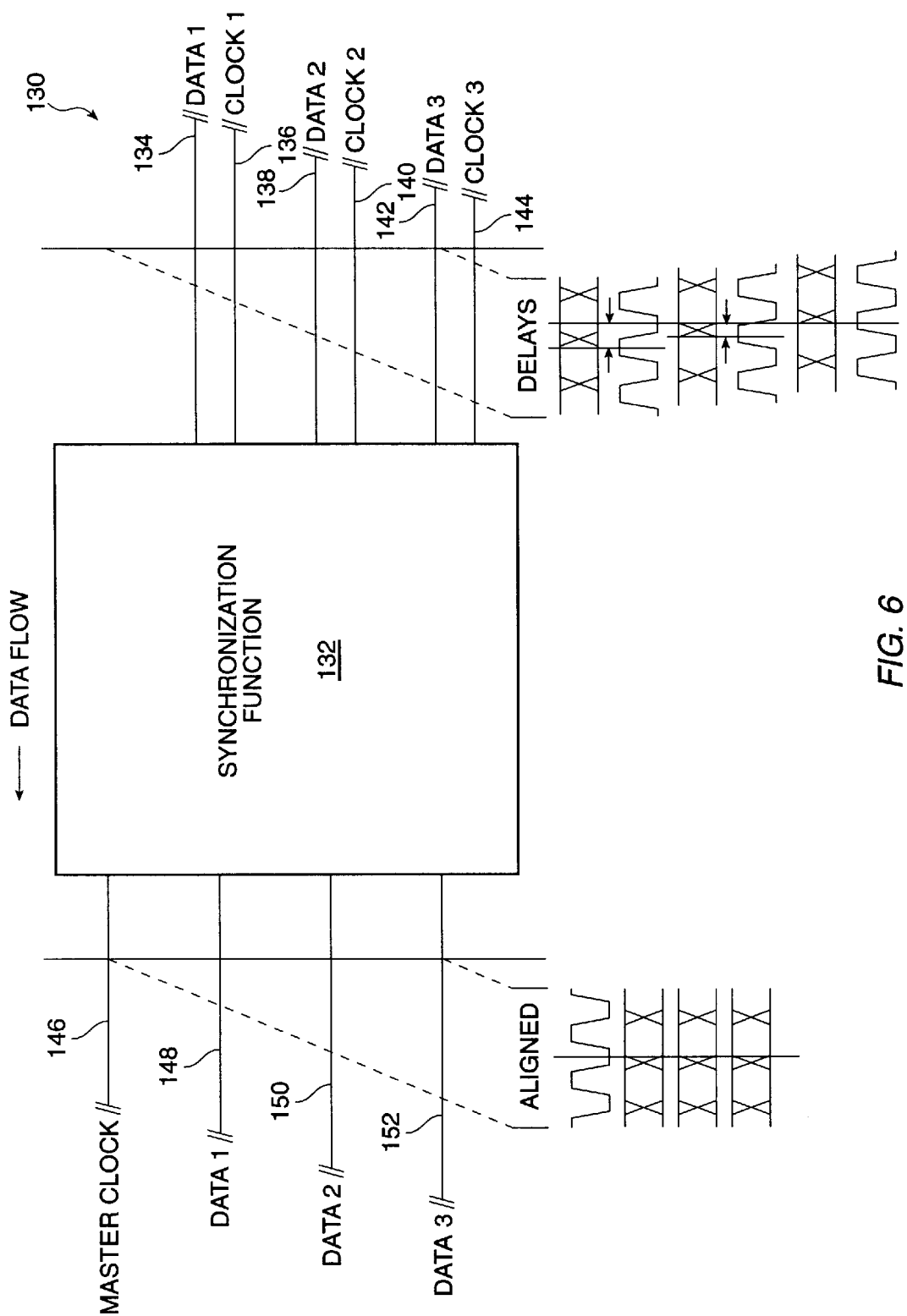
FIG. 6 is a depiction of the synchronization function contemplated by the "PMA Align" function as established by Clause 23, Supplement to IEEE Standard 802.3u for the 100BASE-T4 Physical Coding Sublayer, Physical Medium Attachment Sublayer, and Baseband Medium, and a depicting the synchronization function.

FIG. 6 depicts the synchronization function of a "PMA Align" device as contemplated by Clause 23, "Physical Coding Sublayer (PCS), Physical Medium Attachment Sublayer (PMA) and baseband medium, type 100BASE-T4", Supplement to IEEE Std. 802.3u, Jun. 12, 1995. The synchronization function 130 is implemented by the synchronization device 132, which accepts three clock-data signal pairs (134, 136), (138, 140), (142, 144). The clock-data signal pairs (134, 136), (138, 140), (142, 144) will have unknown (and perhaps random) phase delays between them—examples for illustration only are depicted in FIG. 6. The synchronization device 132 will issue the three data signals 148, 150, 152 in alignment with a master clock signal 146.

The 100BASE-T4 Supplement to IEEE 802.3u does not contemplate any particular device or devices for implementing the "PMA Align" function. Rather, it defines a set of electrical, mechanical, and functional specifications for a 100BASE-T4 compliant device. Therefore, while the inputs, outputs, electrical consumption limits, and minimum functions are described, the protocol does not establish an actual device meeting the standards; that is the task of the data communications integrated circuit designer. As is known to those of ordinary skill in the art, IEEE standards allow for significant design flexibility, and therefore promote commercial competition and improvement.

Figure 7A:
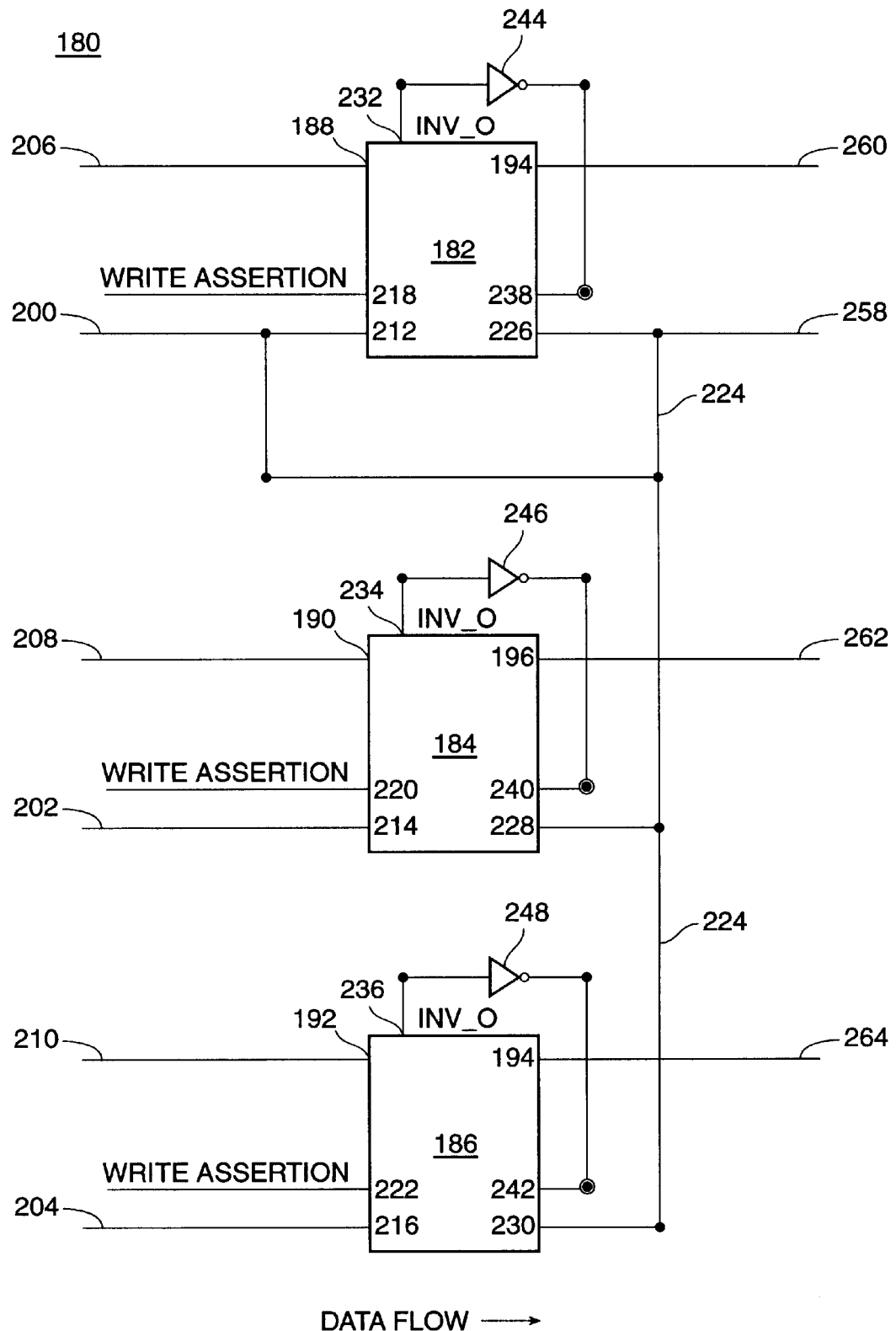
FIG. 7A is a diagram of an application of the present invention as a Multiple Receive Clock-Data Channel Alignment device in a three channel configuration, implementing synchronization in a 100BASE-T4 Fast Ethernet system according to the Clause 23, Supplement to IEEE Standard 802.3u guidelines for the 100BASE-T4 Physical Coding Sublayer, Physical Medium Attachment Sublayer, and Baseband Medium.

FIG. 7A is a detailed diagram of an application of the present invention implementing the clock-data synchronization function according to 100BASE-T4. The 100BASE-T4 protocol, calling for transmission over three clock-data channels, requires a configuration of the present invention implementing alignment of three clock-data channels.

Turning to FIG. 7A, a three channel configuration of the multiple receive clock-data channel alignment device 180 is shown. The multiple clock-data channel alignment device, three channel configuration 180 consists of three storage elements adhering to the FIFO principle 182, 184, 186, each with a data input port 188, 190, 192, and a data output port 194, 196, 198. The clock signal 200, 202, 204 of each clock-data pair (206, 200), (208, 202), (210, 204) serves as the writing clock, connected to the writing clock port 212, 214, 216. A data presence signal is generated by prior circuitry, serves as the write assertion signal, and is received at the write assertion port 218, 220, 222 of each storage element adhering to the FIFO principle 182, 184, 186, though another write assertion signal could be used, or the write assertion signal could be constantly activated, as would be apparent to those of ordinary skill in the of ordinary skill in the art. The master clock signal circuit 22 to each reading clock port 226, 228, 230, and receives signal input from the channel 1 clock signal 200, though another master clock signal could be selected, as would be apparent to one of ordinary skill in the art. The empty-flag indicator port 232, 234, 236 of each storage element adhering to the FIFO principle 182, 184, 186 is attached to the read assertion port 238, 240, 242 of each storage element 182, 184, 186. In this embodiment of the invention, the circuit connecting the empty-flag indicator port 232, 234, 236 and the read assertion port 238, 240, 242 of each storage element utilizes an inverter 244, 246, 248—this allows the presence of stored data in the storage elements adhering to the FIFO principle 182, 184, 186 to activate the reading of the stored data by using the empty-flag indicator. It will be apparent, however, to those of ordinary skill in the art that other means of indicating the presence of stored data and activating the reading of stored data could be used as well.

Typical operation of the multiple clock-data channel alignment device, three channel configuration 180 will begin with the storage elements adhering to the FIFO principle 182, 184, 186 in the 'empty' state. The empty-flag indicator ports 232, 234, 236 will be signaling an 'on' (1) to the inverters 244, 246, 248 connecting the empty-flag indicator port 232, 234, 236 to the read assertion ports 238, 240, 242: the inverter 244, 246, 248 will be sending an 'off', (0) to the respective read assertion port 198, 200, 202. As a clock-data signal pair (206, 200), (208, 202), (210, 204) arrives, the assertion of signals through the respective write assertion port 218, 220, 222 causes the data signal 206, 208, 210 to be read into the storage element adhering to the FIFO principle 182, 184, 186 through the data input port 188, 190, 192. When data is read into a storage element adhering to the FIFO principle 182, 184, 186, the empty-flag indicator port 232, 234, 236 sends an 'off' (0) signal to the respective inverter 244, 246, 248. The inverter then signals an 'on' (1) to the write assertion port, allowing the stored data to be read out according to the signals sent to the reading clock input port 226, 228, 230. The reading clock input port 226, 228, 230 receives signals from the master clock signal circuit 224. The data output streams 260, 262, 264 are read according to the reading clock signal, and therefore aligned with the master clock signal 258. After all data is read from each storage element adhering to the FIFO principle 182, 184, 186, each element is reset—setting the empty-flag indicator port 232, 234, 236 back to "on"—and awaits the beginning of the next cycle.

FIG. 7A describes a preferred embodiment of the application of the present invention, showing the master clock signal circuit 224 attached to a particular incoming clock signal 200. As will be apparent to those of ordinary skill in the art, other sources for the master clock signal 258 could be utilized. As will be apparent to those of ordinary skill in the art, any one of the incoming clock signals 200, 202, 204 could be used, among many other choices. As the invention operates independently of the selection of the master clock signal 258, it will be apparent to one of ordinary skill in the art that significant design flexibility is achieved. In the case of 100BASE-T4 applications, the transmitting clock will be the same for all three parallel channels; the phase shift differences will therefore be generally small. Thus, the preferred embodiment of the present invention, for convenience, uses an incoming clock signal 200 as the master clock signal 258.

Figure 7B:
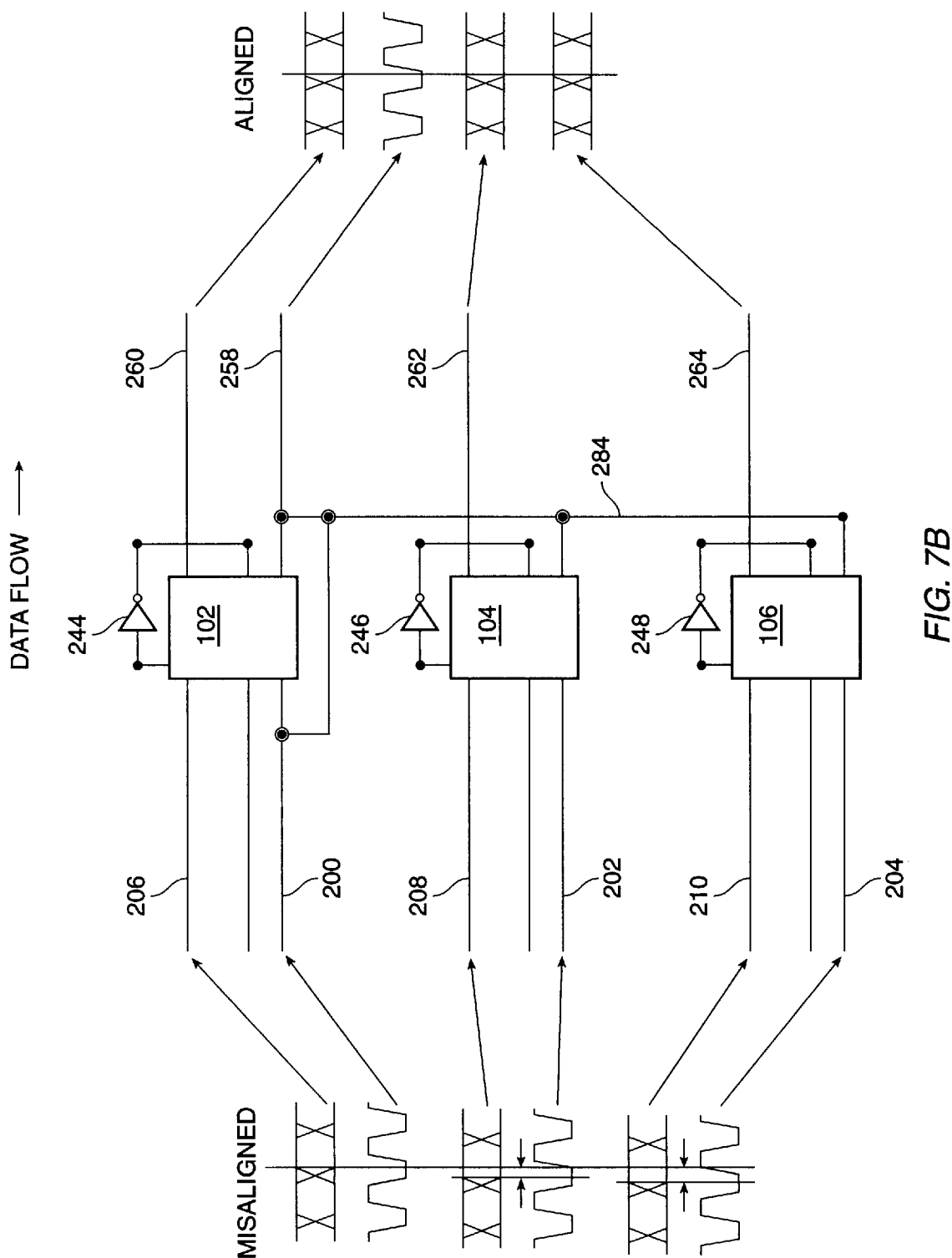
FIG. 7B is a diagram of the application of the present invention as described in FIG. 7A, depicting the alignment function.

FIG. 7B depicts the preferred embodiment of an application of the present invention according to FIG. 7A, depicting the alignment function.

Figure 7C:
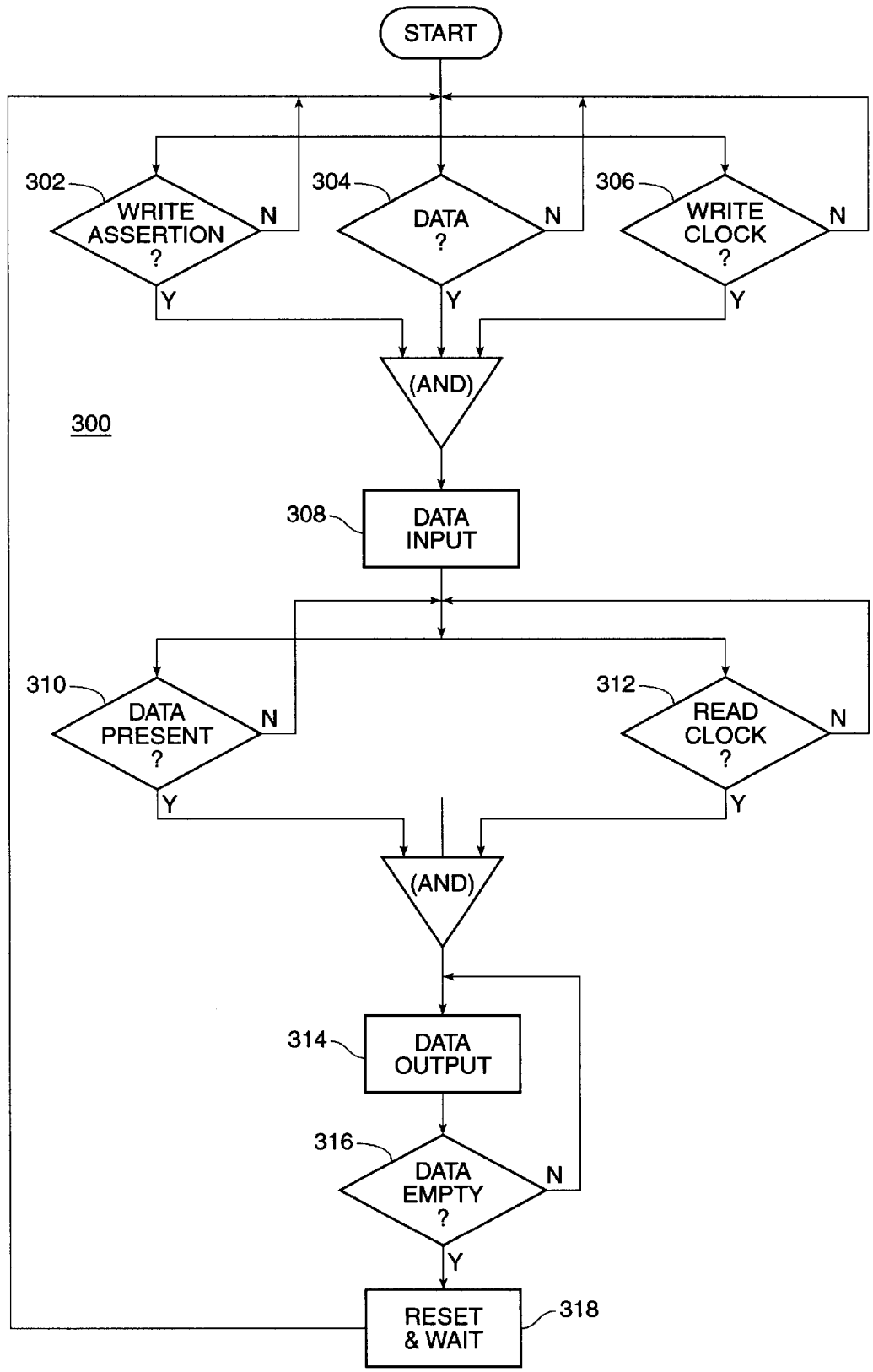
FIG. 7C is a flow chart describing a preferred embodiment of a method for implementing the Multiple Receive Clock-Data Channel Alignment as depicted in FIGS. 7A and 7B, showing an individual channel method.

Turning to FIG. 7C, a preferred embodiment of a method for implementing Multiple Receive Clock-Data Channel Alignment 300 is depicted. The method described in FIG. 7C is for an individual channel; it is, however, applicable to all channels. Upon the assertion of data presence signals at the write assertion port 218, 220, 222, the presence of data at the data input port 188, 190, 192, and the presence of the incoming clock at the writing clock port 212, 214, 216, the three initial decisions 302, 304, 306 will be "yes"—allowing data input to take place 308. After data is stored, a "yes" value on the next two decisions—whether data is present 310 (indicated by the emptyflag indicator port 232, 234, 236 coupled to an inverter 244, 248, 246 and then to the read assertion port 238, 240, 242 in FIG. 7A), and the presence of a reading clock (at the reading clock port 226, 228, 230 in FIG. 7A) will allow data to be read out 314. After all the data is read out of the storage element adhering to the FIFO principle 182, 184, 186, the data empty decision 316 will be "yes"—the device will then be reset 318 and wait for the next cycle.

Application: Alignment of n Parallel Transmission Channels

Figure 8A:
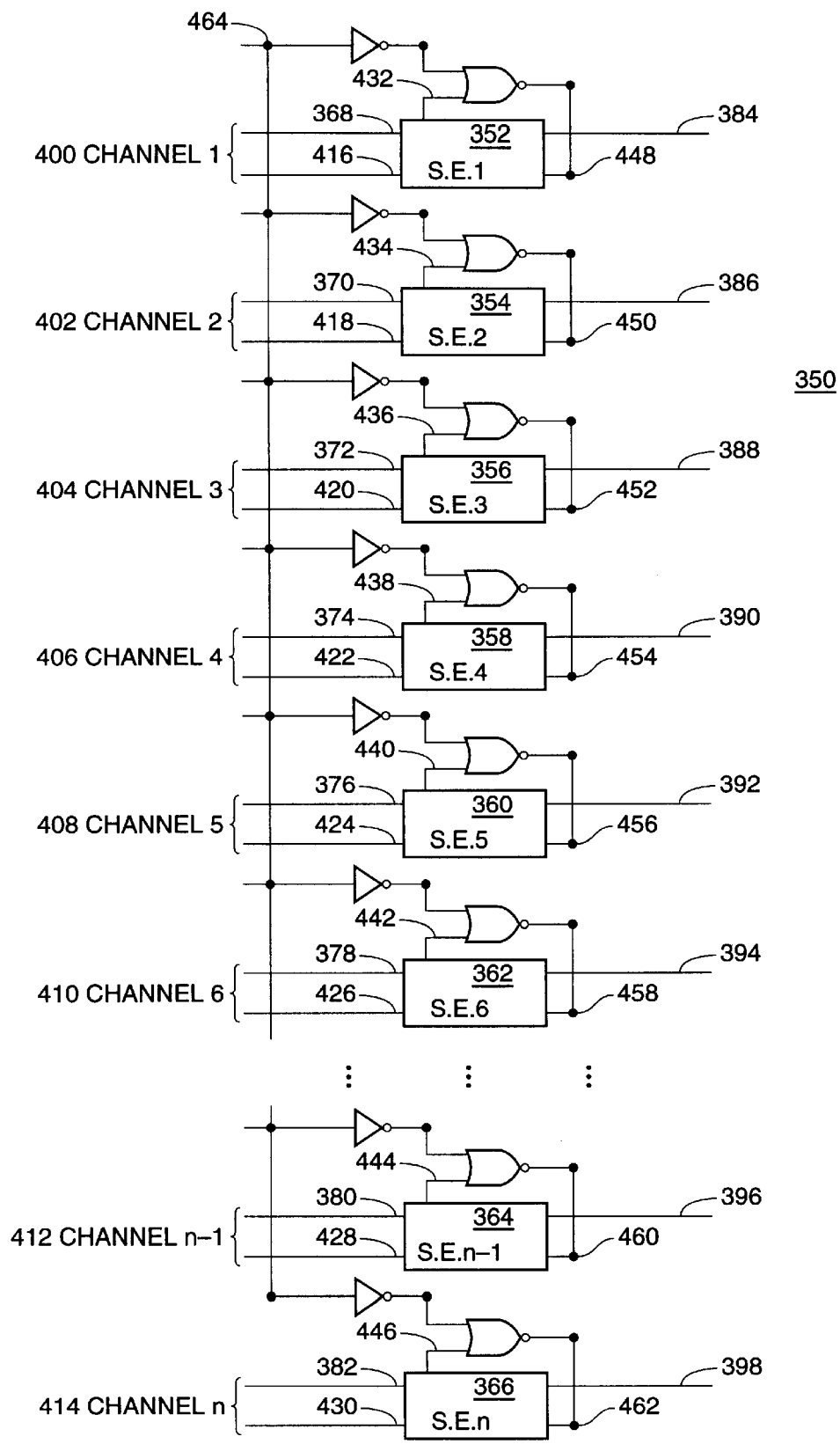
FIG. 8A is a diagram of a preferred embodiment of the present invention, in an n-channel configuration.

FIG. 8A describes an embodiment of the present invention, structured to align n parallel transmission channels, where n is any number greater than 1. The multiple receive clock-data channel alignment device, n-channel configuration 350 consists of n storage elements implementing the FIFO principle 352, 354, 356, 358, 360, 362, 364, 366, each with a data input port 368, 370, 372, 374, 376, 378, 380, 382 and a data output port 384, 386, 388, 390, 392, 394, 396, 398. The clock signal of each clock-data pair 400, 402, 404, 406, 408, 410, 412, 414 serves as the write assertion signal, and is received at the write assertion port 416, 418, 420, 422, 424, 426, 428, 430 of each storage element implementing the FIFO principle 352, 354, 356, 358, 360, 362, 364, 366. The storage element implementing the FIFO principle empty flag output port 432, 434, 436, 438, 440, 442, 444, 446 is attached to a 2-input NOR gate. The read assertion port 448, 450, 452, 454, 456, 458, 460, 462 is connected to the output of the NOR gate. The second input for the NOR gate is connected to the output of an inverter; the inverter input is connected to the master clock circuit 464.

Typical operation of the multiple clock-data channel alignment device, n-channel configuration 350 will begin with the storage elements implementing the FIFO principle 352, 354, 356, 358, 360, 362, 364, 366 in the 'empty' state. The NOR gates are off (Y=0), as the empty flag output is signaling 'on' (1). As a clock-data signal pair 400, 402, 404, 406, 408, 410, 412, 414 arrives, the assertion of signals through the respective write assertion port 416, 418 420, 422, 424, 426, 428, 430 causes the data to be read into the storage element implementing the FIFO principle 352, 354, 356, 358, 360, 362, 364, 366 through the data input port 368, 370, 372, 374, 376, 378, 380, 382. When data is read into a storage element implementing the FIFO principle 352, 354, 356, 358, 360, 362, 364, 366, the empty flag output port 432, 434, 436, 438, 440, 442, 444, 446 sends an 'off' (0) signal to the respective NOR gate. When the master clock circuit 462 signals 'on' (1) to the inverter, the input to the NOR gate is 'off' (0). Thus, when the master clock circuit 464 is on (indicating the correct timing for proper synchronization) and the empty flag output port 432, 434, 436, 438, 440, 442, 444, 446 is off (indicating the availability of data) the read assertion port 448, 450, 452, 454, 456, 458, 460, 462 will receive a read assertion signal, allowing data to be read from each storage element implementing the FIFO principle 352, 354, 356, 358, 360, 362, 364, 366 through the data output port 384, 386, 388, 390, 392, 394, 396, 398. After all data is read from each storage element implementing the FIFO principle 352, 354, 356, 358, 360, 362, 364, 366, each element is reset—setting the empty flag output port 432, 434, 436, 438, 440, 442, 444, 446 back to "on"—awaiting the beginning of the next cycle.

Figure 8B:
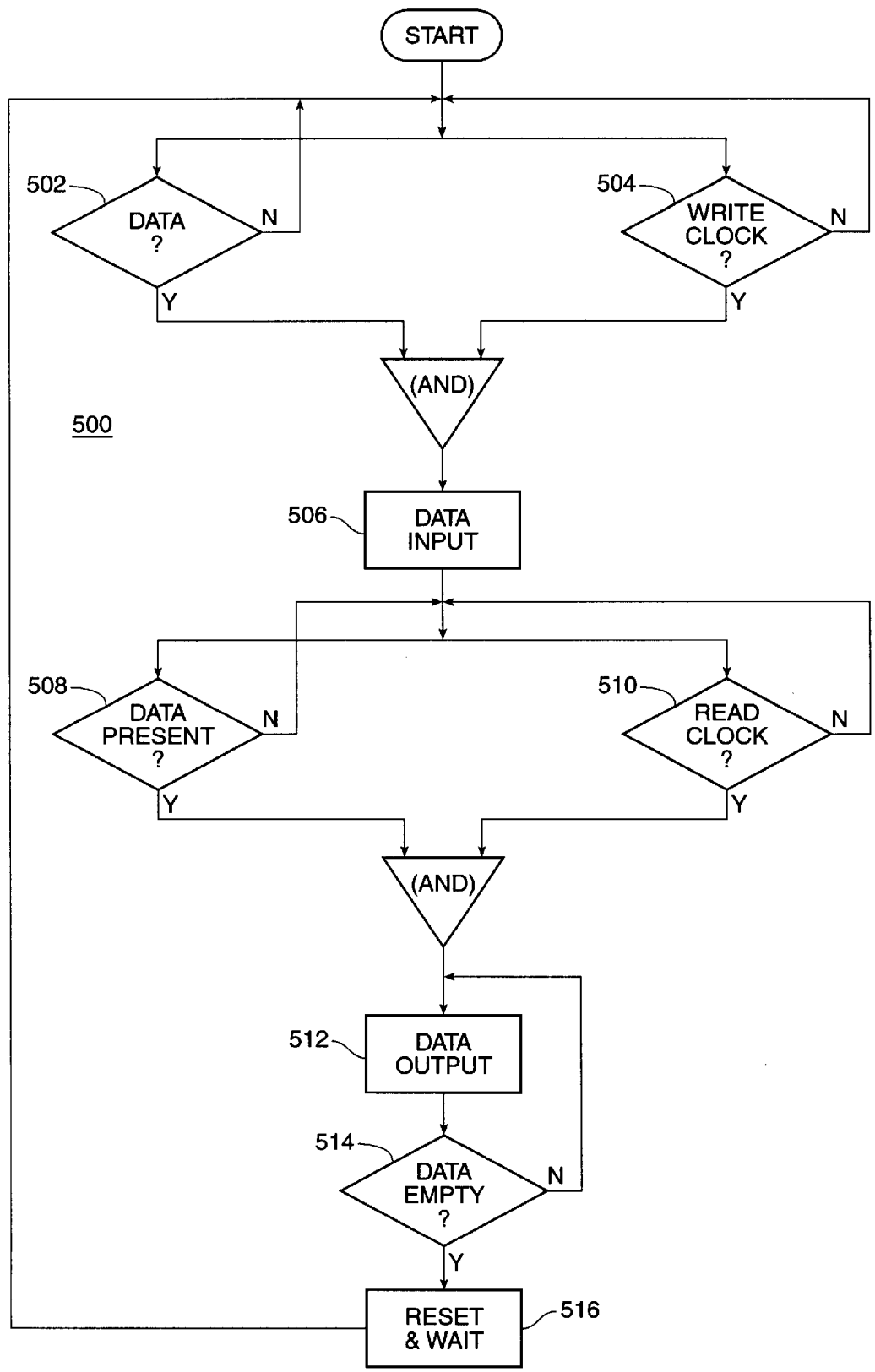
FIG. 8B is a flow chart describing a preferred embodiment of a method for implementing the Multiple Receive Clock-Data Channel Alignment as depicted in FIG. 8A, showing an individual channel method.

Turning now to FIG. 8B, a preferred embodiment of a method for implementing Multiple Receive Clock-Data Channel Alignment 500 is depicted. The method described in FIG. 8B is for an individual channel; it is, however, applicable to all channels. Upon the assertion of data at the data input port 368, 370, 372, 374, 376, 378, 380, 382, and the presence of the incoming clock at the write assertion port 416, 418 420, 422, 424, 426, 428, 430, the two initial decisions 502, 504, will be "yes"—allowing data input to take place 506. After data is stored, a "yes" value on the next two decisions—whether data is present 508 (indicated by the empty flag output port 432, 434, 436, 438, 440, 442, 444, 446 in FIG. 8A), and the presence of a reading clock 510 (the master clock circuit 462 in FIG. 8A) will allow data to be read out 512. After all the data is read out of the storage element implementing the FIFO principle 352, 354, 356, 358, 360, 362, 364, 366, the data empty decision 514 will be "yes"—the device will then be reset 516 and wait for the next cycle.

Alternative Embodiment: Alignment of Parallel Transmission Channels With Known Maximum Phase Delays Those of ordinary skill in the art will realize that various embodiments of the invention could be used for various applications. For example, FIG. 9A describes an alternative embodiment of the invention in a three-channel configuration. This embodiment is functionally similar to the above embodiments, except that it does not require the use of a status indicator (such as an empty-flag) for the storage elements—the write assertion signal is tied to the read assertion signal through a delay line. This embodiment will be useful in applications where the maximum phase delay between the channels is known.

Figure 9A:
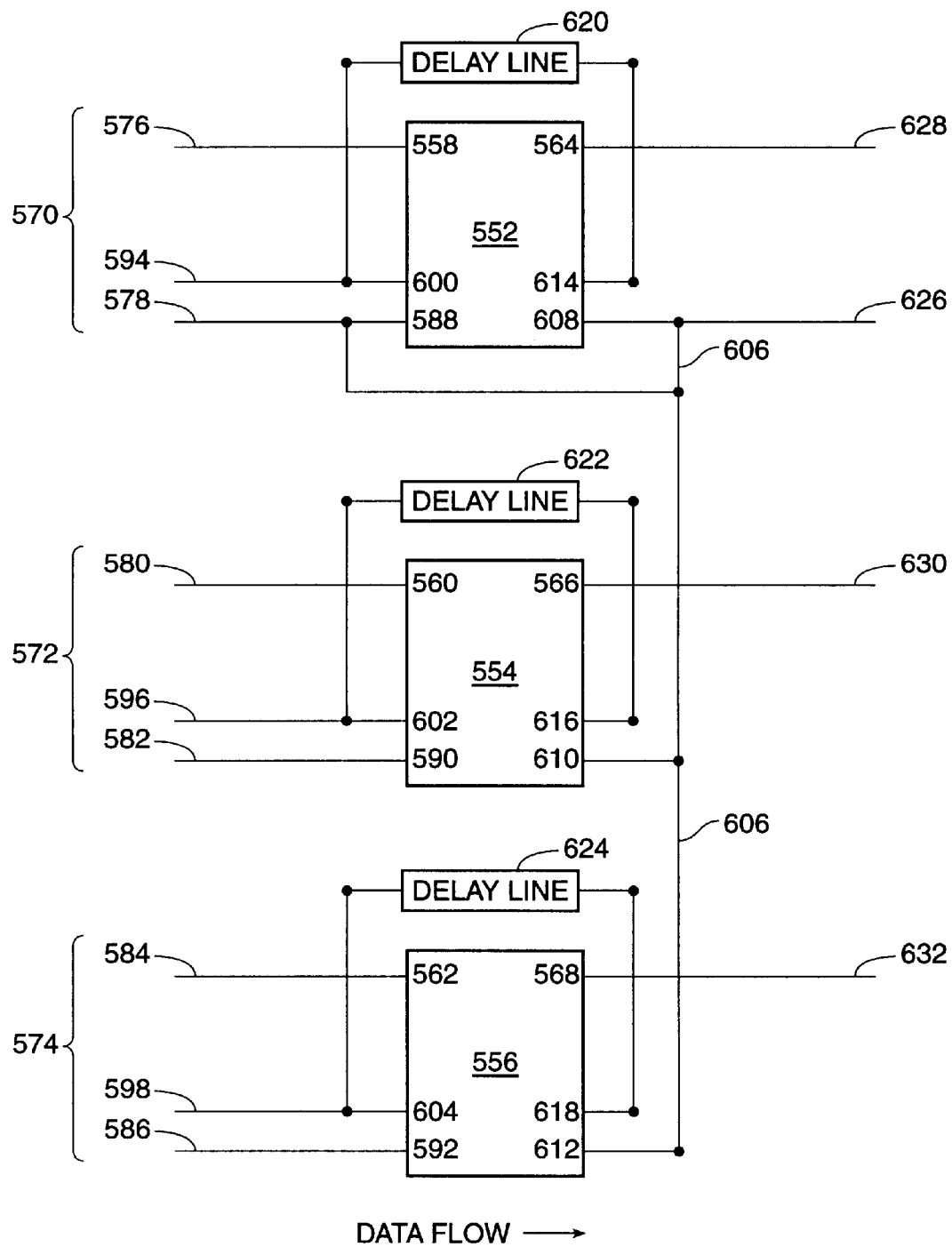
FIG. 9A is a diagram of a preferred embodiment of the present invention, in a three-channel configuration with delay lines.

Turning to FIG. 9A, the Multiple Receive Clock-Data Channel Alignment device, three channel configuration using delay lines 550 consists of three storage elements implementing the FIFO principle 552, 554, 556, each with a data input port 558, 560, 562 and a data output port 564, 566, 568. The clock signal 578, 582, 586 of an incoming clock-data pair (576, 578), (580, 582), (584, 586), is attached to the writing clock port 588, 590, 592. A data presence signal 594, 596, 598 is generated by prior circuitry, serves as the write assertion signal, and is received at the write assertion port 600, 602, 604 of each storage element adhering to the FIFO principle, though another write assertion signal could be used, or the write assertion signal could be constantly activated, as would be apparent to those of ordinary skill in the art. The master clock signal circuit 606 is attached to each reading clock port 608, 610, 612, and receives signal input from the channel 1 clock signal 578, though another master clock signal could be selected, as would be apparent to one of ordinary skill in the art. Each write assertion port 600, 602, 604 is connected to each read assertion port 614, 616, 618 through a delay line 620, 622, 624; thus, the write assertion signals will serve to activate the reading of stored data after an established delay time lag.

Typical operation of the Multiple Receive Clock-Data Channel Alignment device, three channel configuration using delay lines 550 will be as follows. For example, if the known maximum phase delay between any incoming clock-data signal pair and a master clock signal was 100 ns, then a proper delay line setting would be equal to or greater than 100 ns. Those of ordinary skill in the art will recognize that any delay line setting would be possible, however—limited only by the desired application. Note however, with greater delay line setting, greater depth of storage elements (or FIFO memories) would be required.

The operation would begin with the storage elements adhering to the FIFO principle 552, 554, 556 in the 'empty' state. As a clock-data signal pair (576, 578), (580, 582), (584, 586) arrives, the assertion of signals through the respective write assertion port 600, 602, 604 causes the data signal to be read into the storage element adhering to the FIFO principle 552, 554, 556 through the data input port 558, 560, 562. The write assertion signals also enter the delay line 620, 622, 624, where they are delayed for at least the above-mentioned 100 ns, then activate the reading of the stored data through the data output port 564, 566, 568 in conjunction with the signal received at the reading clock input port 608, 610, 612. The reading clock input port 608, 610, 612 is attached to the master clock signal circuit 606, and thus the reading clock signal is the master clock signal 626, which is in turn set by an incoming clock signal 578, though another master clock signal could be selected, as would be apparent to one of ordinary skill in the art. The data output signals 628, 630, 632 are read according to the reading clock signal, and are therefore aligned with the master clock signal 626.

FIG. 9A describes a preferred embodiment of the application of the present invention, showing the master clock signal circuit 606 attached to a particular incoming clock signal 578. As will be apparent to those of ordinary skill in the art, other sources for the master clock signal 626 could be utilized. As will also be apparent to those of ordinary skill in the art, any one of the incoming clock signals 578, 582, 586 could be used, among many other choices. As the invention operates independently of the selection of the master clock signal 626, it will be apparent to one of ordinary skill in the art that significant design flexibility is achieved. In many applications, the transmitting clock will be the same for all three parallel channels; the phase shift differences will therefore be generally small. Thus, the preferred embodiment of the present invention, for convenience and accuracy, uses an incoming clock signal 578 as the master clock signal 626. After all data is read from each storage element adhering to the FIFO principle 552, 554, 556, each element is reset—awaiting the beginning of the next cycle.

Figure 9B:
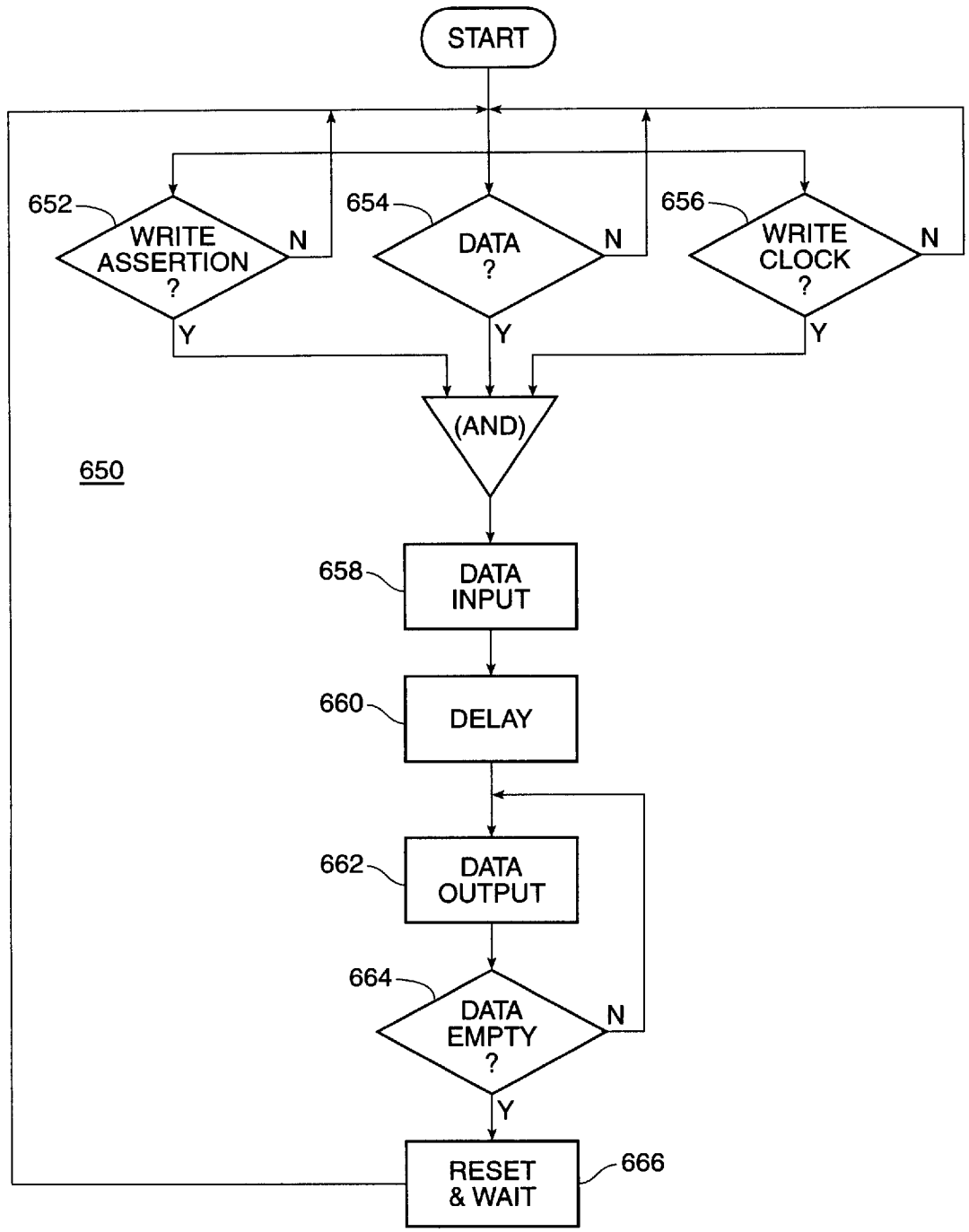
FIG. 9B is a flow chart describing a preferred embodiment of a method for implementing the Multiple Receive Clock-Data Channel Alignment as depicted in FIG. 9A, showing an individual channel method.

Turning to FIG. 9B, a preferred embodiment of a method for implementing Multiple Receive Clock-Data Channel Alignment 600 is depicted. The method described in FIG. 9B is for an individual channel; it is, however, applicable to all channels. Upon the assertion of data presence signals at the write assertion port 600, 602, 604, the presence of data at the data input port 558, 560, 562, and the presence of the incoming clock at the writing clock port 588, 590, 592, the three initial decisions 652, 654, 656 will be "yes"—allowing data input to take place 658. Data is stored for the known delay period 660, then read out 662. After all the data is read out of the storage element adhering to the FIFO principle 552, 554, 556, the data empty decision 664 will be "yes"—the device will then be reset 666 and wait for the next cycle.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A multiple clock-data channel alignment circuit comprising:
    a plurality of data storage elements, each data storage element having a data input port, a data output port, a read assertion port, a write assertion port, and a status indicator port;
    a plurality of parallel transmission channel inputs, each said parallel transmission channel input attached to a corresponding said data storage element;
    a plurality of read control circuits, each said read control circuit attached to the read assertion port of a corresponding said data storage element, and capable of activating the reading of stored data signals from said corresponding data storage element;
    a master clock signal circuit attached to each of said read control circuits.

2. The multiple clock-data channel alignment circuit according to claim 1 wherein said data storage elements are First-In-First-Out (FIFO) memories.

3. The multiple clock-data channel alignment circuit according to claim 1 wherein said activation of the reading of said stored data signals is dependent upon the indication of data signals available to be read from the corresponding said data storage element and dependent upon signals received from said master clock signal circuit.

4. A multiple clock-data channel alignment circuit comprising:
    a plurality of data storage elements, each data storage element having a data input port, a data output port, a read assertion port, a write assertion port, and a status indicator port;
    a plurality of parallel transmission channel inputs, each said parallel transmission channel input attached to a corresponding said data storage element;
    a master clock signal circuit;
    a plurality of read control circuits, each said read control circuit accepting inputs from the status indicator port of a corresponding said data storage element and said master clock signal circuit, each said read control circuit capable of sending output to the read assertion port of a corresponding said data storage element.

5. The multiple clock-data channel alignment circuit according to claim 4 wherein said data storage elements are First-In-First-Out (FIFO) memories.

6. The multiple clock-data channel alignment circuit according to claim 4 wherein said activation of the reading of said stored data signals is dependent upon the indication of data signals available to be read from the corresponding said data storage element and dependent upon signals received from said master clock signal circuit.

7. A multiple clock-data channel alignment circuit comprising:
    a plurality of data storage elements, each said data storage element capable of receiving data inputs, storing data signals, and allowing stored data signals to be read in the order in which they were received, each said data storage element also capable of indicating the presence of stored data signals, and each said data storage element also capable of controlling the input of data and the output of data according to received external signals;
    a plurality of parallel transmission channel inputs, each said parallel transmission channel input attached to a corresponding said data storage element;
    a master clock signal circuit;
    a plurality of read control circuits, each said read control circuit attached to a corresponding said data storage element, and capable of activating the reading of stored data signals from said corresponding data storage element.

8. The multiple clock-data channel alignment circuit according to claim 7 wherein said data storage elements are First-In-First-Out (FIFO) memories.

9. The multiple clock-data channel alignment circuit according to claim 7 wherein said activation of the reading of said stored data signals is dependent upon the indication of data signals available to be read from the corresponding said data storage element.

10. A multiple clock-data channel alignment circuit comprising:
    a plurality of data storage elements, each said data storage element capable of receiving data inputs, storing data signals, and allowing stored data signals to be read in the order in which they were received, each said data storage element also capable of indicating the presence of stored data signals, and each said data storage element also capable of controlling the input of data and the output of data according to received external signals;
    a plurality of parallel transmission channel inputs, each said parallel transmission channel input attached to a corresponding said data storage element;
    a master clock signal circuit;
    a plurality of read control circuits, each said read control circuit accepting inputs from the status indicator port of a corresponding said data storage element and said master clock signal circuit, each said read control circuit capable of sending output to the read assertion port of a corresponding said data storage element.

11. The multiple clock-data channel alignment circuit according to claim 10 wherein said data storage elements are First-In-First-Out (FIFO) memories.

12. The multiple clock-data channel alignment circuit according to claim 10 wherein said activation of the reading of said stored data signals is dependent upon the indication of data signals available to be read from the corresponding said data storage element and dependent upon signals received from said master clock signal circuit.

13. A multiple clock-data channel alignment circuit comprising:

means for accepting a plurality of parallel transmission channels;

a plurality of data storage elements, each said data storage element accepting one of said parallel transmission channels, said data storage elements capable of maintaining the order of data elements within stored data signals;

means for indicating the availability of said stored data signals to be read from each of said data storage elements;

means for activating the reading of said stored data signals from each of said data storage elements in conjunction with a master clock signal.

14. The multiple clock-data channel alignment circuit according to claim 13 wherein said data storage elements are First-In-First-Out (FIFO) memories.

15. The multiple clock-data channel alignment circuit according to claim 13 wherein said activation of the reading of said stored data signals is dependent upon the indication of data signals available to be read from the corresponding said data storage element and dependent upon signals received from said master clock signal circuit.

16. A multiple clock-data channel alignment circuit comprising:

means for accepting a plurality of parallel transmission channels;

a plurality of data storage elements, each said data storage element accepting a corresponding said parallel transmission channel, said data storage elements capable of maintaining the order of data elements within stored data signals;

a plurality of indicator outputs, each said indicator output attached to a corresponding said data storage element, said indicator outputs capable of signifying the availability of data signals to be read from said data storage elements;

a plurality of read assertion inputs, each said read assertion input attached to a corresponding said data storage element, said read assertion inputs capable of activating the reading of stored data signals from the said data storage elements;

a master clock signal circuit, said master clock signal circuit capable of signaling said read assertion inputs to activate the reading of said stored data signals in alignment with a master clock signal.

17. The multiple clock-data channel alignment circuit according to claim 16 wherein said data storage elements are First-In-First-Out (FIFO) memories.

18. The multiple clock-data channel alignment circuit according to claim 16 wherein said activation of the reading of said stored data signals is dependent upon the indication of data signals available to be read from the corresponding said data storage element and dependent upon signals received from said master clock signal circuit.

19. A multiple clock-data channel alignment circuit comprising:

means for accepting a plurality of parallel transmission channels;

a plurality of data storage elements, each said data storage element accepting a corresponding said parallel transmission channel, said data storage elements capable of maintaining the order of data elements within stored data signals, capable of indicating the availability of said stored data signals to be read, and capable of activating the reading of said stored data signals upon the receipt of a read assertion signal;

a master clock signal circuit, said master clock signal circuit capable of issuing a read assertion signal to each of said data storage elements to activate the reading of said stored data signals in alignment with a master clock signal.

20. The multiple clock-data channel alignment circuit according to claim 19 wherein said data storage elements are First-In-First-Out (FIFO) memories.

21. The multiple clock-data channel alignment circuit according to claim 19 wherein said activation of the reading of said stored data signals is dependent upon the indication of data signals available to be read from the corresponding said data storage element and dependent upon signals received from said master clock signal circuit.

22. A multiple clock-data channel alignment circuit comprising:

a plurality of data storage elements, each data storage element having a data input port, a data output port, a read assertion port, a write assertion port, and a status indicator port;

a plurality of parallel transmission channel inputs, each said parallel transmission channel input attached to a corresponding said data storage element;

a plurality of read control circuits, each said read control circuit attached to a corresponding said data storage element, and capable of activating the reading of stored data signals from said corresponding data storage element;

a master clock signal circuit attached to each of said read control circuits and accepting input from a clock signal of one of said plurality parallel transmission channel inputs.

23. The multiple clock-data channel alignment circuit according to claim 22 wherein said data storage elements are First-In-First-Out (FIFO) memories.

24. The multiple clock-data channel alignment circuit according to claim 22 wherein said activation of the reading of said stored data signals is dependent upon the indication of data signals available to be read from the corresponding said data storage element and dependent upon signals received from said master clock signal circuit.

25. A multiple clock-data channel alignment circuit comprising:

a plurality of data storage elements, each data storage element having a data input port, a data output port, a read assertion port, a write assertion port, and a status indicator port;

a plurality of parallel transmission channel inputs, each said parallel transmission channel input attached to a corresponding said data storage element;

a master clock signal circuit accepting input from a clock signal of one of said plurality parallel transmission channel inputs;

a plurality of read control circuits, each said read control circuit accepting inputs from the status indicator port of a corresponding said data storage element and said master clock signal circuit, each said read control circuit capable of sending output to the read assertion port of a corresponding said data storage element.

26. The multiple clock-data channel alignment circuit according to claim 25 wherein said data storage elements are First-In-First-Out (FIFO) memories.

27. The multiple clock-data channel alignment circuit according to claim 25 wherein said activation of the reading of said stored data signals is dependent upon the indication of data signals available to be read from the corresponding said data storage element and dependent upon signals received from said master clock signal circuit.

28. A multiple clock-data channel alignment circuit comprising:

- a plurality of data storage elements, each said data storage element capable of receiving data inputs, storing data signals, and allowing stored data signals to be read in the order in which they were received, each said data storage element also capable of indicating the presence of stored data signals, and each said data storage element also capable of controlling the input of data and the output of data according to received external signals;
- a plurality of parallel transmission channel inputs, each said parallel transmission channel input attached to a corresponding said data storage element;
- a master clock signal circuit accepting input from a clock signal of one of said plurality parallel transmission channel inputs;
- a plurality of read control circuits, each said read control circuit attached to a corresponding said data storage element, and capable of activating the reading of stored data signals from said corresponding data storage element.

29. The multiple clock-data channel alignment circuit according to claim 28 wherein said data storage elements are First-In-First-Out (FIFO) memories.

30. The multiple clock-data channel alignment circuit according to claim 28 wherein said activation of the reading of said stored data signals is dependent upon the indication of data signals available to be read from the corresponding said data storage element.

31. A multiple clock-data channel alignment circuit comprising:

- a plurality of data storage elements, each said data storage element capable of receiving data inputs, storing data signals, and allowing stored data signals to be read in the order in which they were received, each said data storage element also capable of indicating the presence of stored data signals, and each said data storage element also capable of controlling the input of data and the output of data according to received external signals;
- a plurality of parallel transmission channel inputs, each said parallel transmission channel input attached to a corresponding said data storage element;
- a master clock signal circuit accepting input from a clock signal of one of said plurality parallel transmission channel inputs;
- a plurality of read control circuits, each said read control circuit accepting inputs from the status indicator port of a corresponding said data storage element and said master clock signal circuit, each said read control circuit capable of sending output to the read assertion port of a corresponding said data storage element.

32. The multiple clock-data channel alignment circuit according to claim 31 wherein said data storage elements are First-In-First-Out (FIFO) memories.

33. The multiple clock-data channel alignment circuit according to claim 31 wherein said activation of the reading of said stored data signals is dependent upon the indication of data signals available to be read from the corresponding said data storage element and dependent upon signals received from said master clock signal circuit.

34. A multiple clock-data channel alignment circuit comprising:

- a plurality of storage elements, each said storage element allowing the output of stored data signals to be controlled;
- a plurality of parallel transmission channel inputs, each said parallel transmission channel input attached to a corresponding said storage element;
- a plurality of data channel outputs, each said data channel output attached to a corresponding said storage element;
- a master clock circuit, said master clock circuit attached to each of said plurality of storage elements, said master clock circuit capable of providing each of said plurality of storage elements with a master clock signal;
- a plurality of read control circuits, each said read control circuits attached to a corresponding said storage element, said read control circuits capable of activating the reading of stored data from a corresponding said storage element in conjunction with said master clock signal.

35. The multiple clock-data channel alignment circuit according to claim 34 wherein:

- said plurality of storage elements are additionally capable of signifying the presence of said stored data through a status indicator port;
- said plurality of read control circuits are additionally attached to the said status indicator port of said corresponding storage element;
- said activation of the reading of stored data is dependent upon the indication of the presence of said stored data signals from the said corresponding storage element.

36. The multiple clock-data channel alignment circuit according to claim 34 wherein said storage elements are First-In-First-Out (FIFO) memories.

37. The multiple clock-data channel alignment circuit according to claim 35 wherein said storage elements are First-In-First-Out (FIFO) memories.

38. A multiple clock-data channel alignment circuit comprising:

- a plurality of storage elements, each said storage element allowing the output of stored data signals to be controlled;
- means for accepting a plurality of parallel transmission channel inputs, each said means for accepting a plurality of parallel transmission channel inputs attached to a corresponding said storage element;
- means for allowing the reading of a plurality of data channel outputs, each said means for allowing the reading of a plurality of data channel outputs attached to a corresponding said storage element;
- means for providing a master clock signal to each of said plurality of storage elements;
- means for activating the reading of stored data from a corresponding said storage element in conjunction with said master clock signal.

39. The multiple clock-data channel alignment circuit according to claim 38 wherein:

- said plurality of storage elements are additionally capable of signifying the presence of said stored data through a status indicator port;

said means for activating the reading of stored data are additionally attached to the said status indicator port of said corresponding storage element;

said activation of the reading of stored data is dependent upon the indication of the presence of said stored data signals from the said corresponding storage element.

40. The multiple clock-data channel alignment circuit according to claim 38 wherein said storage elements are First-In-First-Out (FIFO) memories.

41. The multiple clock-data channel alignment circuit according to claim 39 wherein said storage elements are First-In-First-Out (FIFO) memories.

42. A method for aligning multiple clock-data channels comprising the steps of:

accepting a plurality of parallel clock-data transmission channels;

storing the data signals of each said plurality of parallel clock-data transmission channels in separate data storage elements while maintaining the order of data elements within said stored data signals;

indicating the availability of data signals to be read out of each of said data storage elements;

allowing the reading of said stored data signals out of corresponding said data storage elements in alignment with a master clock signal.

43. A method for aligning multiple clock-data channels comprising the steps of:

accepting a plurality of parallel clock-data transmission channels;

storing the data signals of each said plurality of parallel clock-data transmission channels in separate data storage elements while maintaining the order of data elements within said stored data signals;

indicating the availability of data signals to be read out of each of said data storage elements;

allowing the reading of said stored data signals out of corresponding said data storage elements in alignment with a master clock signal, said reading of the plurality of stored data signals in response to the indication of available stored data from the corresponding said data storage element and dependent upon said master clock signal.

44. A multiple clock-data channel alignment circuit comprising:

a plurality of data storage elements, each data storage element having a data input port, a data output port, a read assertion port, and a write assertion port;

a plurality of parallel transmission channel inputs, each said parallel transmission channel input attached to a corresponding said data storage element;

a plurality of read control circuits, each said read control circuits attached to a corresponding said read assertion port and a corresponding said write assertion port, and capable of activating the reading of stored data signals from a corresponding said data storage element according;

a master clock signal circuit attached to each of said data storage elements.

45. The multiple clock-data channel alignment circuit according to claim 44 wherein said data storage elements are First-In-First-Out (FIFO) memories.

46. The multiple clock-data channel alignment circuit according to claim 44 wherein said activation of the reading of said stored data signals is dependent upon the activation of the writing of data signals into said data storage elements.

47. A multiple clock-data channel alignment circuit comprising:

means for accepting a plurality of parallel transmission channels;

a plurality of data storage elements, each said data storage element accepting one of said parallel transmission channels, said data storage elements capable of maintaining the order of data elements within stored data signals;

means for activating the reading of said stored data signals from each of said data storage elements in conjunction with a master clock signal, said reading of stored data signals occurring a fixed time period after the writing of said data signals into said data storage elements.

48. The multiple clock-data channel alignment circuit according to claim 47 wherein said data storage elements are First-In-First-Out (FIFO) memories.

49. A method for aligning multiple clock-data channels comprising the steps of:

accepting a plurality of parallel clock-data transmission channels;

storing the data signals of each said plurality of parallel clock-data transmission channels in separate data storage elements while maintaining the order of data elements within said stored data signals;

allowing the reading of said stored data signals out of corresponding said data storage elements in alignment with a master clock signal, said reading occurring a fixed delay period after the writing of said data signals into said corresponding data storage element.

* * * * *